United States Patent Office 3,285,258
Patented Nov. 15, 1966

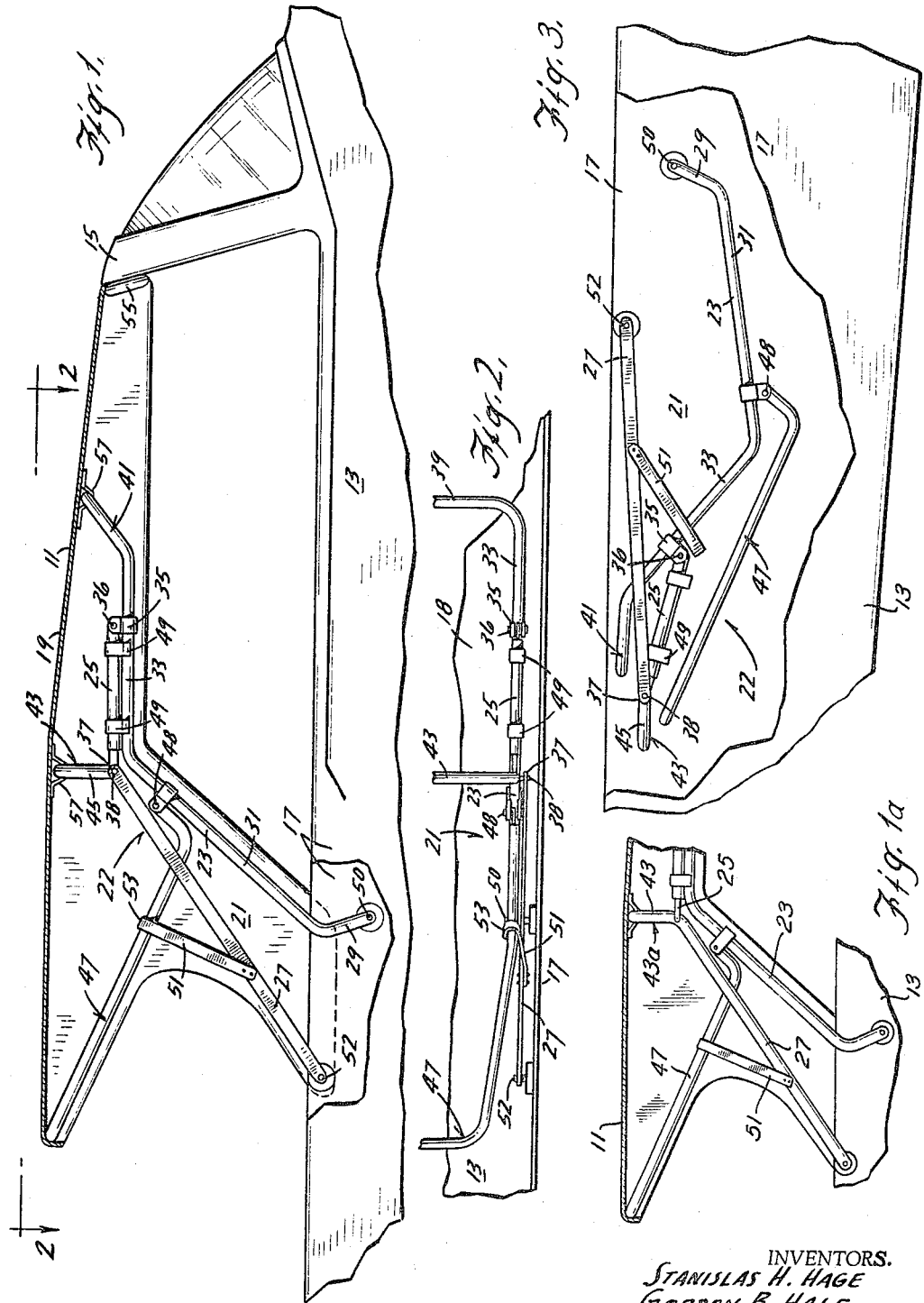

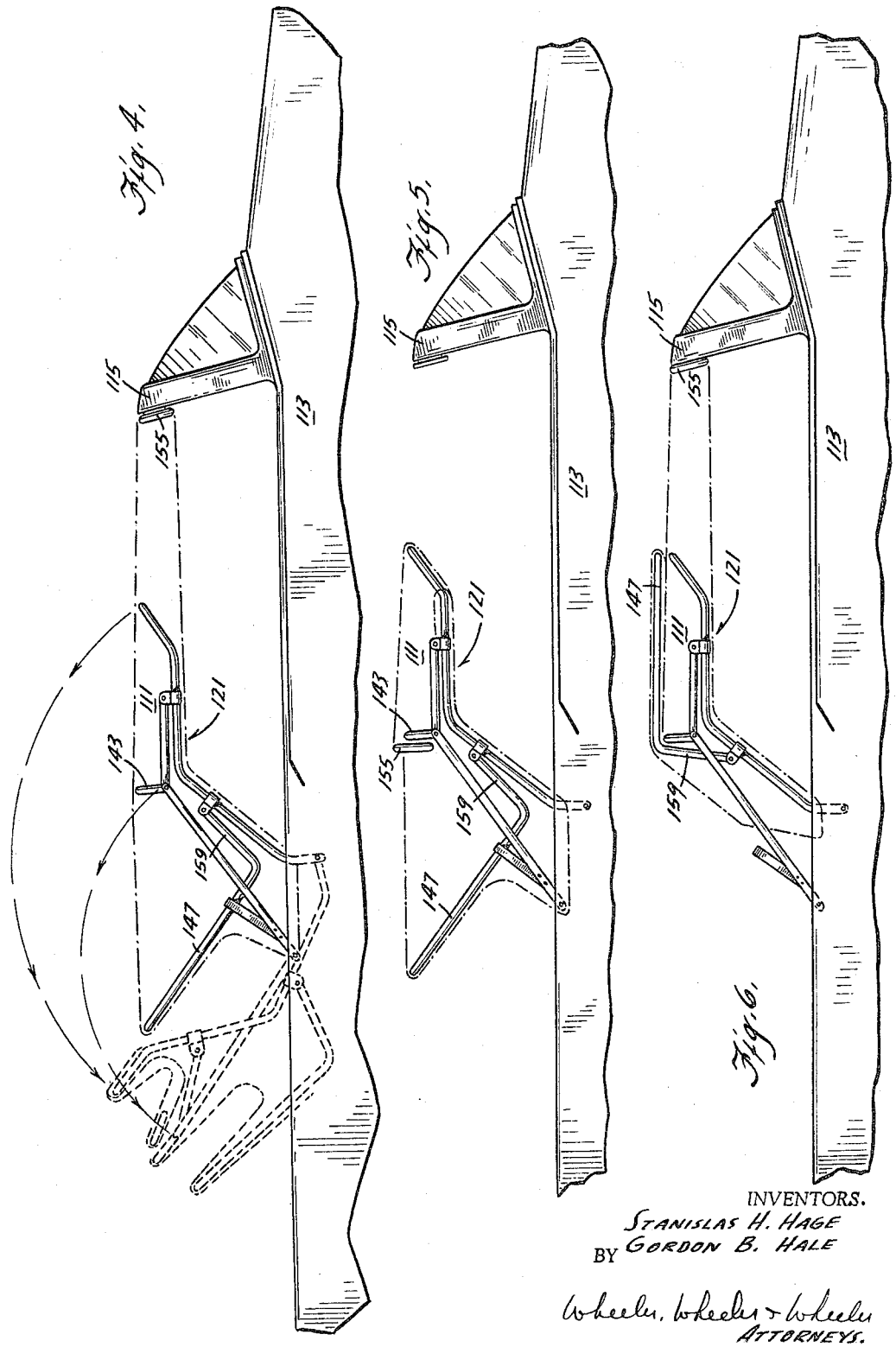

3,285,258
FOLDING SOFT TOP
Stanislas H. Hage, Lake Bluff, and Gordon B. Hale, Waukegan, Ill., assignors to Outboard Marine Corporation, Waukegan, Ill., a corporation of Delaware
Filed May 1, 1962, Ser. No. 191,628
19 Claims. (Cl. 135—6)

The invention relates generally to convertible tops for vehicles, and more particularly to folding soft tops for boats.

The invention provides a frame for a folding soft top, which frame includes a linkage composed of three pivotally connected links, which linkage, when mounted on a vehicle, is movable between a self-standing, erected condition and a collapsed storage condition. The self-standing position is determined by parallel engagement of a portion of one link with a portion of another one of the links. In the preferred embodiment, a pair of identical linkages are intergrated in spaced parallel relation to each other by use of at least one cross bow including, at its ends, one of the links of each of the linkages, thereby providing for manual displacement of the soft top by one hand between its erected and collapsed conditions.

The invention also contemplates an auxiliary cross bow carried between the linkages for movement relative thereto to vary the area covered by the soft top. Arrangement of the soft top with maximum coverage is facilitated by a brace or strap extending from the basic frame and engageable with the auxiliary cross bow to limit movement thereof so as to establish the cross bow in such erected condition that the cover is tightly stretched fore and aft.

The principal objects of the invention are the provision of an improved frame for a convertible soft top and the provision of a superior soft top installation for boats. Other objects and advantages of the invention will become known by reference to the following description and the accompanying drawings of two embodiments of the invention.

FIGURE 1 is a fragmentary elevational view of a boat embodying a convertible soft top installation incorporating various of the features of the invention;

FIGURE 1a is a fragmentary view similar to a portion of FIGURE 1, illustrating a modified construction;

FIGURE 2 is a fragmentary view taken along line 2—2 of FIGURE 1;

FIGURE 3 is a partially broken away, fragmentary elevational view of the boat shown in FIGURE 1, with the soft top frame shown in its collapsed condition with the cover omitted;

FIGURE 4 is a side elevational view of a boat embodying a modified soft top installation, showing in full lines one arrangement of the soft top when in erected condition;

FIGURE 5 is a view similar to FIGURE 4 showing a second arrangement of the soft top when in erected condition; and FIGURE 6 is a view similar to FIGURES 4 and 5 showing the soft top in another erected condition.

The folding soft top 11 shown in FIGURE 1 is installed on a conventional boat 13 including a forward windshield frame 15 and rearwardly extending members 17 defining the sides of a passenger well or area 18. The folding soft top 11 includes a cover 19 of flexible, moisture impervious material, such as canvas, imitation leather or the like, and a supporting frame 21.

The frame 21 includes, on each side, a linkage 22 incorporating three interconnected links or elements 23, 25, and 27. More particularly, each of the forwardly located links 23 is adapted at its lower end for pivotal connection to one of the side members 17 and is bent to provide a first short leg or portion 29, a second relatively long leg or portion 31, and a third leg or portion 33 which, when the frame is in its erected condition, is generally horizontal. The length of the legs 29, 31, and 33, and the angles therebetween, can be widely varied depending upon aesthetic requirements.

Adjacent its other or upper end, each of the forward links 23 is pivotally connected by a suitable fitting 35 and pintle 36 to one end of one of the connecting links 25, which, in turn, are each pivotally connected, at their other or rearward ends, through a suitable connection 37 and pintle 38, to the upper end of one of the rearward links 27. At its other or lower end, each of the rearward links 27 is adapted for pivotal connection to one of the side members 17 of the boat 13.

The linkages 22 on each side of the boat 13 are integrated for movement in unison, at a forward portion of the soft top, by a cross bar or member 39 which, in the preferred construction, constitutes a middle part of a U-shaped bow 41 including, at each end, one of the forward links 23. Midway of the soft top, the linkages 22 are integrated by a second U-shaped cross member or bow 43 including relatively short legs 45 which are respectively pivotally connected to the connections 37 joining the connecting and rearward links 25 and 27. If desired, the cross bow 43 can be constructed as a part of an integral bow including either of the connecting or rearward links 25 or 27. FIG. 1a shows the cross bow 43 integrally formed with the rearward links 27 in a unitary bow 43a. The linkages 22 are further integrated, rearwardly of the soft top, by an auxiliary cross bow or link 47 which is mounted by pintles 48 to the long legs 31 of the forward links 23. The cross bow 47 also serves to support the rearward end of the cover 19.

The frame 21 is installed on the boat 13 by connection of the lower ends of the forward and rearward links 23 and 27 to respective pintles 50 and 52 mounted on the side members 17. More particularly, the pintles 50 mounting the forward links 23 are located forwardly of the pintles 52 mounting the rearward links 27 and preferably are also lower than the pintles 52, thereby facilitating complete disposition of the frame, when in its collapsed condition, below the deck line. As shown in FIGURE 2, the forward and connecting links 23 and 25, in each linkage 22, are mounted for movement in a common vertical plane parallel to the center line of the boat 13, while the rearward links 27 move in outwardly adjacent vertical planes.

When installed, there is provided a soft top frame including an integrated pair of linkages 22 which are movable, in unison, between a forwardly located, self-standing erected condition and a rearwardly disposed, collapsed storage condition, either on the after deck or in a storage recess.

Means are provided on the forward links 23 and on the connecting links 25 for limiting angular movement therebetween to establish the frame in its erected position. In the specifically disclosed construction, the frame 21 is self-standing in its erected condition by reason of engagement, in parallel relation in each of the linkages 22, of a portion of the connecting link 25 with a portion of the third leg 33 of the forward link 23 when the center of gravity of the soft top is located forwardly of the center point between the pivotal connections of the forward and rearward links 23 and 27 to the boat 13. If desired, frictional grips, such as indicated at 49, can be employed to releasably retain the third leg 33 of the forward link 23 in parallel relation with the connecting link 25.

The cross bow 47 is automatically engaged and retained in position to effect taut stretching of the cover across the top of the frame 21 by means of a latch bar or strap 51 which extends in fixed relation from the rearward link 27. As shown in FIGURES 1 and 2, the latch bar is a strap member having some flexibility in a lengthwise plane and includes a reversely bent hook-shaped outer end or portion 53.

When the frame 21 is in its collapsed condition, as shown in FIGURE 3, the hooked end 53 of the strap 51 faces in a generally upwardly open direction and the auxiliary cross bow 47 is disposed therebelow. During erection of the soft top 11, the rearward link 27 is swung through an angle of about 135°, whereby the hooked end portion 53 becomes downwardly open. At the same time, the cross bow 47 rotates with the forward link 23 and, during approach of the frame 21 to its erected condition, engagement of the now downwardly open hooked end 53 limits clockwise movement of the auxiliary cross bow 47 relative to the forward link 23, thereby establishing the erected position of the cross bow 47.

The cover 19 is attached to the frame 21 to generally effect disposition thereof in covering relation to the passenger well 18 when the frame 21 is in erected condition. Specifically, at its forward end the cover 19 is attached to a cross member 55 which is releasably attachable to the windshield frame 15. The cover 19 is also attached to the bows 41 and 43 by loops 57 or other suitable connection. At its rearward end the cover is attached to the cross bow 47 in any suitable manner. The rear margin of the cover can also include provision for removably attaching a rear curtain or windshield panel (not shown). In addition, removable side panels or curtains (not shown) can be provided.

FIGURES 4, 5, and 6 show a slightly modified soft top 111 which includes a frame 121 and which is shown in three different erected arrangements. In FIGURE 4, the soft top 111 is shown in fully erected condition. In FIGURE 5, the soft top 111 is shown with its forward portion folded rearwardly by locating the cross member 155 in rearwardly adjacent relation to the bow 143, thereby providing an opening between the soft top 111 and the windshield frame 115. In FIGURE 6, the soft top 111 is shown with the rearward part thereof folded upwardly in overlying relation to the adjacent part of the soft top. This disposition is made possible by shaping the cross bow 147 with a leg portion 159 which is longer than the corresponding portion of the cross bow 47 shown in FIGURES 1, 2 and 3, by disconnecting the bow 147 from a strap which extends from the rearward link in like manner to the strap 51 extending from the rearward link 27 shown in FIGURE 1, and by swinging the bow 147 in the clockwise direction, as shown in FIGURE 6, into the position shown in FIGURE 6. Disconnection of the cross bow 147 from the strap is afforded by initially partially collapsing the frame from its erected condition, as explained with respect to the embodiment shown in FIGURES 1 through 3 and, when the cross bow 147 is disengaged from the strap, releasably bending or displacing the strap out of the path of the cross bow 147 as the frame is re-erected and during swinging of the cross bow 147 in the clockwise direction as shown in FIGURE 6. Bending of the strap out of the path of the cross bow 147 is afforded by the flexibility which is incorporated therein and which has already been referred to with respect to the strap 51.

Various of the features of the invention are set forth in the following claims.

What is claimed is:

1. The combination of a boat hull and a convertible top including a cover and a supporting frame mounted on said hull for movement between an erected condition and a storage condition and including a forward link including a first portion pivotally attached to said hull and a second portion disposed at an angle to said first portion in forwardly extending disposition, a rearward link pivotally mounted to said hull at a point spaced rearwardly from the connection of said first link with said hull, a connecting link, first pivot means connecting said second portion of said forward link and said connecting link, second pivot means connecting said rearward link and said connecting link, and means on said forward link and on said connecting link for limiting angular movement about said first pivot means between said forward link and said connecting link to establish said frame in its erected condition.

2. The combination of a boat hull and a convertible top including a cover and a supporting frame mounted on said hull for movement between an erected condition and a storage condition, said frame including a forward link including a first portion pivotally attached to said hull and a second portion disposed at an angle to said first portion in forwardly extending disposition, a rearward link pivotally mounted to said hull at a point spaced rearwardly from the connection of said first link with said hull, a connecting link pivotally connected to said second portion of said forward link and pivotally connected to said rearward link, means on said forward link and on said connecting link for limiting angular movement therebetween to establish said frame in its erected condition, an auxiliary link pivotally connected to one of said forward and rearward links, and means on one of said forward and rearward links for engaging said auxiliary link to limit angular movement of said auxiliary link in the direction toward the pivotal connection of said connecting and rearward links when said frame is in its erected condition.

3. A structure as set forth in claim 2 wherein said auxiliary link is pivotally mounted to said first portion of said forward link, and said means for engaging said auxiliary link constitutes a strap extending in fixed relation from said rearward link and including, at its outer end, a reversely bent hook.

4. A structure as set forth in claim 3 wherein said auxiliary link includes a portion bent at an angle with respect to the remainder of said auxiliary link, said portion being located adjacent the pivotal mounting of said auxiliary link and being of sufficient length to permit disposition of the remainder of said auxiliary link in a generally horizontal disposition above said forward and rearward links.

5. A structure as set forth in claim 2 wherein said frame includes two spaced duplicate linkages, and said forward links and said auxiliary links respectively constitute portions of U shaped bows.

6. A structure as set forth in claim 5 including a third U shaped bow joining the pivotal connections of said connecting and rearward links.

7. A structure as set forth in claim 5 wherein said connecting links constitute portions of a U shaped bow.

8. A structure as set forth in claim 5 wherein said rearward links constitute portions of a U shaped bow.

9. The combination of a boat hull and a convertible top including a cover and a supporting frame mounted on said hull for movement between an erected condition and a storage condition, said frame including a forward link including a first portion pivotally attached to said hull and a second portion disposed at an angle to said first portion in forwardly extending disposition, a rearward link pivotally mounted on said hull at a point spaced rearwardly from the connection of said first link with said hull, a connecting link pivotally connected to said second portion of said forward link and pivotally connected to said rearward link, and means on said forward link and on said connecting link for limiting angular movement therebetween to establish said frame in its erected condition and including
a part of said connecting link engaged in parallel relation with said second portion of said forward link.

10. A cover supporting frame for a convertible top comprising
a first link including two portions bent at an angle to each other with one of said portions being adapted, adjacent its free end, for pivotal mounting to a rigid support,
a second link adapted adjacent one end for pivotal mounting to the rigid support,
a third link,
first pivot means connecting the other portion of said first link and said third link,
second pivot means connecting said second link and said third link, and
means on said first and third links for engagement with each other to limit angular movement between said first and third links about said first pivot means when said first and second links are fixed to the rigid support with the connection of said second link to the rigid support being spaced from the connection of said first link to the rigid support in the direction opposite from the direction of extension of said other portion relative to the connection of said first link with the rigid support, thereby to establish said first, second, and third links in an erected condition relative to the rigid support.

11. A cover supporting frame for a convertible top comprising a first link including two portions bent at an angle to each other with one of said portions being adapted, adjacent its free end, for pivotal mounting to a rigid support, a second link adapted adjacent one end for pivotal mounting to the rigid support, a third link pivotally connected to the other portion of said first link and pivotally connected to said second link, and means on said first and third links for engagement with each other to limit angular movement therebetween when said first and second links are fixed to the rigid support with the connection of said second link to the rigid support being spaced from the connection of said first link to the rigid support in the direction opposite from the direction of extension of said other portion relative to the connection of said first link with the rigid support, thereby to establish said first, second, and third links in an erected condition relative to the rigid support,
said means limiting angular movement between said first and third links including engaged parallel disposition of a part of said third link with said other portion of said first link.

12. A cover supporting frame for a convertible top comprising a first link including two portions bent at an angle to each other with one of said portions being adapted, adjacent its free end, for pivotal mounting to a rigid support, a second link adapted to adjacent one end for pivotal mounting to the rigid support, a third link pivotally connected to the other portion of said first link and pivotally connected to said second link, means on said first and third links for engagement with each other to limit angular movement therebetween when said first and second links are fixed to the rigid support with the connection of said second link to the rigid support being spaced from the connection of said first link to the rigid support in the direction opposite from the direction of extension of said other portion relative to the connection of said first link with the rigid support, thereby to establish said first, second and third links in an erected condition relative to the rigid support,
a fourth link pivotally connected to one of said first and second links, and
means on one of said first and second links for engaging said fourth link when said fourth link extends transversely of said second link to limit angular movement of the free end of said fourth link in the direction toward the pivotal connection of said second and third links.

13. A frame as set forth in claim 12 wherein
said frame includes two spaced duplicate linkages and said first links and said fourth links respectively constitute portions of U shaped bows.

14. A frame as set forth in claim 13 including
a third U shaped bow joining the pivotal connections of said second and third links.

15. A frame as set forth in claim 13 wherein
said second links constitute portions of a U shaped bow.

16. A frame as set forth in claim 13 wherein
said third links constitute portions of a U shaped bow.

17. A frame as set forth in claim 12 wherein
said fourth link is pivoted to said one portion of said first link, and
said means for engaging said fourth link constitutes a strap extending in fixed relation from said second link and including, at its outer end, a reversely bent hook.

18. The combination of a boat hull and a convertible top including a cover and a supporting frame mounted on said hull for movement between an erected condition and a storage condition, and including a forward link pivotally attached to said hull, a rearward link pivotally mounted to said hull at a point spaced rearwardly from the connection of said forward link with said hull, a connecting link pivotally connected to said forward link and pivotally connected to said rearward link, and releasably engageable means on said forward link and on said connecting link for limiting angular movement between said forward link and said connecting link about their pivotal connection to establish said frame in its erected condition.

19. A cover supporting frame for a convertible top comprising a first link adapted to adjacent one end for pivotal mounting to a rigid support, a second link adapted adjacent one end for pivotal mounting to the rigid support, a third link pivotally connected to said first link and pivotally connected to said second link, and releasably engageable means on said first and third links for limiting angular movement between said first and third links about their pivotal connection so as to establish said first, second, and third links in an erected condition relative to the rigid support when said first and second links are fixed to the rigid support.

References Cited by the Examiner
UNITED STATES PATENTS

| 2,280,729 | 4/1942 | Sutton | 9—1 |
| 2,823,684 | 2/1958 | Sartori | 135—6 |

FOREIGN PATENTS

| 417,913 | 2/1947 | Italy. |

HARRISON R. MOSELEY, *Primary Examiner.*

C. S. KAIMAN, L. J. SANTISI, W. E. HEATON,
*Assistant Examiners.*